(12) United States Patent  
Aoyagi et al.

(10) Patent No.: US 12,644,897 B2  
(45) Date of Patent: Jun. 2, 2026

(54) AUTOMATIC ANALYZER AND SAMPLE STORAGE DEVICE

(71) Applicant: HITACHI HIGH-TECH CORPORATION, Tokyo (JP)

(72) Inventors: Shota Aoyagi, Tokyo (JP); Kenichi Yagi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 583 days.

(21) Appl. No.: 18/026,216

(22) PCT Filed: Oct. 13, 2021

(86) PCT No.: PCT/JP2021/037951  
§ 371 (c)(1),  
(2) Date: Mar. 14, 2023

(87) PCT Pub. No.: WO2022/091790  
PCT Pub. Date: May 5, 2022

(65) Prior Publication Data  
US 2023/0333129 A1 Oct. 19, 2023

(30) Foreign Application Priority Data  
Oct. 30, 2020 (JP) ................................. 2020-182163

(51) Int. Cl.  
*G01N 35/00* (2006.01)  
*G01N 35/02* (2006.01)  
(Continued)

(52) U.S. Cl.  
CPC ..... *G01N 35/00623* (2013.01); *G01N 35/026* (2013.01); *G01N 35/1002* (2013.01);  
(Continued)

(58) Field of Classification Search  
CPC ........... G01N 35/00623; G01N 35/026; G01N 35/1002; G01N 35/02; G01N 35/04;  
(Continued)

(56) References Cited

U.S. PATENT DOCUMENTS

2008/0286162 A1 11/2008 Onizawa et al.  
2010/0086440 A1 4/2010 Fattinger et al.  
(Continued)

FOREIGN PATENT DOCUMENTS

EP 2169405 A2 3/2010  
JP 9-43249 A 2/1997  
(Continued)

OTHER PUBLICATIONS

International Search Report of PCT/JP2021/037951 dated Nov. 30, 2021.  
(Continued)

*Primary Examiner* — Benjamin R Whatley  
(74) *Attorney, Agent, or Firm* — MATTINGLY & MALUR, PC

(57) ABSTRACT

An automatic analyzer includes a transportation line that executes carrying-in/out of a sample rack in which a sample is mounted from/to an analyzation unit, a cold storage that cools a plurality of the sample racks in which the sample having been measured in the analyzation unit is mounted, a transportation control unit that executes operation control for carrying-in of the sample rack from the transportation line to the cold storage and operation control for carrying-out of the sample rack from the cold storage to the transportation line, a front chamber that is disposed between the cold storage and the transportation line, the inner space of the front chamber being shielded from the outside, and a temperature/humidity control unit that controls temperature of the inside of the front chamber to temperature/humidity  
(Continued)

between those of the outside of the cold storage and those of the inside of the cold storage.

13 Claims, 8 Drawing Sheets

(51) Int. Cl.
  *G01N 35/10*          (2006.01)
  *G01N 1/10*           (2006.01)
  *G01N 35/04*          (2006.01)
(52) U.S. Cl.
  CPC ................ *G01N 2001/1081* (2013.01); *G01N 2035/00346* (2013.01); *G01N 2035/00445* (2013.01); *G01N 2035/00455* (2013.01); *G01N 35/02* (2013.01); *G01N 35/04* (2013.01)
(58) Field of Classification Search
  CPC . G01N 2001/1081; G01N 2035/00346; G01N 2035/00445; G01N 2035/00455
  See application file for complete search history.

(56)                References Cited

U.S. PATENT DOCUMENTS

| | | | | |
|---|---|---|---|---|
| 2013/0028697 | A1* | 1/2013 | Neeper | G01N 35/04 |
| | | | | 700/214 |
| 2015/0204598 | A1 | 7/2015 | Affleck et al. | |
| 2015/0276782 | A1* | 10/2015 | Riether | G01N 35/04 |
| | | | | 700/230 |

| | | | | |
|---|---|---|---|---|
| 2016/0069918 | A1* | 3/2016 | Holmes | G01N 35/1002 |
| | | | | 901/41 |
| 2018/0209999 | A1* | 7/2018 | Han | G01N 35/00613 |
| 2019/0293344 | A1 | 9/2019 | Sun et al. | |

FOREIGN PATENT DOCUMENTS

| | | | | |
|---|---|---|---|---|
| JP | 10-157808 | A | | 6/1998 |
| JP | 2001-99844 | A | | 4/2001 |
| JP | 2005-247551 | A | | 9/2005 |
| JP | 2006-300847 | A | | 11/2006 |
| JP | 2006-349221 | A | | 12/2006 |
| JP | 3133890 | U | | 7/2007 |
| JP | 2011-191207 | A | | 9/2011 |
| JP | 2012-137329 | A | | 7/2012 |
| JP | 2013-13434 | A | | 1/2013 |
| JP | 2013013434 | A | * | 1/2013 |
| JP | 2013-190245 | A | | 9/2013 |
| JP | 2015-064220 | A | | 4/2015 |
| JP | 2017-508984 | A | | 3/2017 |
| JP | 2017-116356 | A | | 6/2017 |
| JP | 2019-158537 | A | | 9/2019 |
| JP | 2019-219205 | A | | 12/2019 |
| WO | 2014/016334 | A1 | | 1/2014 |

OTHER PUBLICATIONS

International Preliminary Report on Patentability received in corresponding International Application No. PCT/JP2021/037951 dated May 4, 2023.
Extended European Search Report received in corresponding European Application No. 21885909.8 dated Sep. 2, 2024.
Japanese Office Action received in corresponding Japanese Application No. 2022-558991 dated Oct. 31, 2023.

* cited by examiner

107

AUTOMATIC ANALYZER AND SAMPLE STORAGE DEVICE

TECHNICAL FIELD

The present invention relates to an automatic analyzer executing qualitative and quantitative analysis of samples originating from a plurality of types of organisms such as blood, urine, and cerebrospinal fluid and a sample storage device appropriate for the automatic analyzer.

BACKGROUND ART

As an example of an automatic analyzer capable of preventing deterioration in dispensation accuracy of a sample, PTL 1 discloses an automatic analyzer including a supply unit that supplies waste heat occurring in the automatic analyzer, a transportation mechanism unit that carries a sample container held in a sample rack to a transportation unit, and a first temperature sensor that detects temperature of the sample inside the sample container. The transportation mechanism unit transports the sample container that stores a sample in which a temperature detected by the first temperature sensor is equal to or greater than a lower limit temperature to a dispensation position at which the sample is dispensed, and transports the sample container that stores a sample of which a temperature detected by the first temperature sensor is lower than the lower limit temperature to a waiting position inside a sampler unit.

CITATION LIST

Patent Literature

PTL 1: JP2019-158537A

SUMMARY OF INVENTION

Technical Problem

In automatic analyzers that add reagents to samples and measure changes in colors of reaction liquids using photometers or the like to perform qualitative and quantitative analysis of target components in samples, an improvement in reproducibility of measurement results and acceleration of measurement can be achieved. Therefore, the automatic analyzers have been introduced mainly into major hospitals and clinical examination centers.

There are devices in which a plurality of analyzation modules are connected via sample transportation lines to satisfy improvements in measurement processing capabilities and needs of varieties of measurement items.

Here, samples measured by automatic analyzers are stored for given periods in cold storages equipped to prevent evaporation and remeasure the samples and are subsequently carried out from devices.

However, temperatures of the samples just taken out from the cold storages at the time of remeasurement are low. When temperature is low, viscosity is increased. Therefore, when the remeasurement is executed in automatic analyzers with samples just taken out, dispensation accuracy deteriorates. Therefore, inaccurate analysis results may be obtained.

As an example of an automatic analyzer preventing deterioration in dispensation accuracy due to such an increase in viscosity of a sample, there is a technology disclosed in PTL 1.

However, in the technology for preventing deterioration in dispensation accuracy, as disclosed in PTL 1, a sample of which a temperature is low can be warmed up to a preset temperature, but there are problems that, when condensation occurring in a container that contains a sample because of a difference in temperature is not considered, the sample is diluted when the condensation occurs, and thus there is an influence on an analysis result. Accordingly, it is apparent to the present inventors and the like that there is a room for further improvement.

The problem that a sample is diluted due to condensation particularly occurs in dispensation of a minute amount in recent years, and thus a solution to the problem is required.

The prevent invention has been devised in view of the problems of the technology of the related art and provides an automatic analyzer and a sample storage device capable of inhibiting condensation in a container that contains a sample.

Solution to Problem

The present invention includes a plurality of means for solving the foregoing problems. For example, an automatic analyzer includes: an analyzation unit; a transportation line that executes carrying-in/out of a rack in which a sample is mounted from/to the analyzation unit; a cold storage that cools a plurality of the racks in which the sample having been measured in the analyzation unit is mounted, a control unit that executes operation control for carrying-in of the rack from the transportation line to the cold storage and operation control for carrying-out of the rack from the cold storage to the transportation line; a front chamber that is disposed between the cold storage and the transportation line, an inner space of the front chamber being shielded from the outside; and a temperature control unit that controls a temperature of the inside of the front chamber to a temperature between that of the outside of the cold storage and that of the inside of the cold storage.

Advantageous Effects of Invention

According to the present invention, it is possible to inhibit condensation in a container that stores a sample. The other problems, configurations, and effects are apparent from description of the following embodiments.

DESCRIPTION OF EMBODIMENTS

Figure 1:
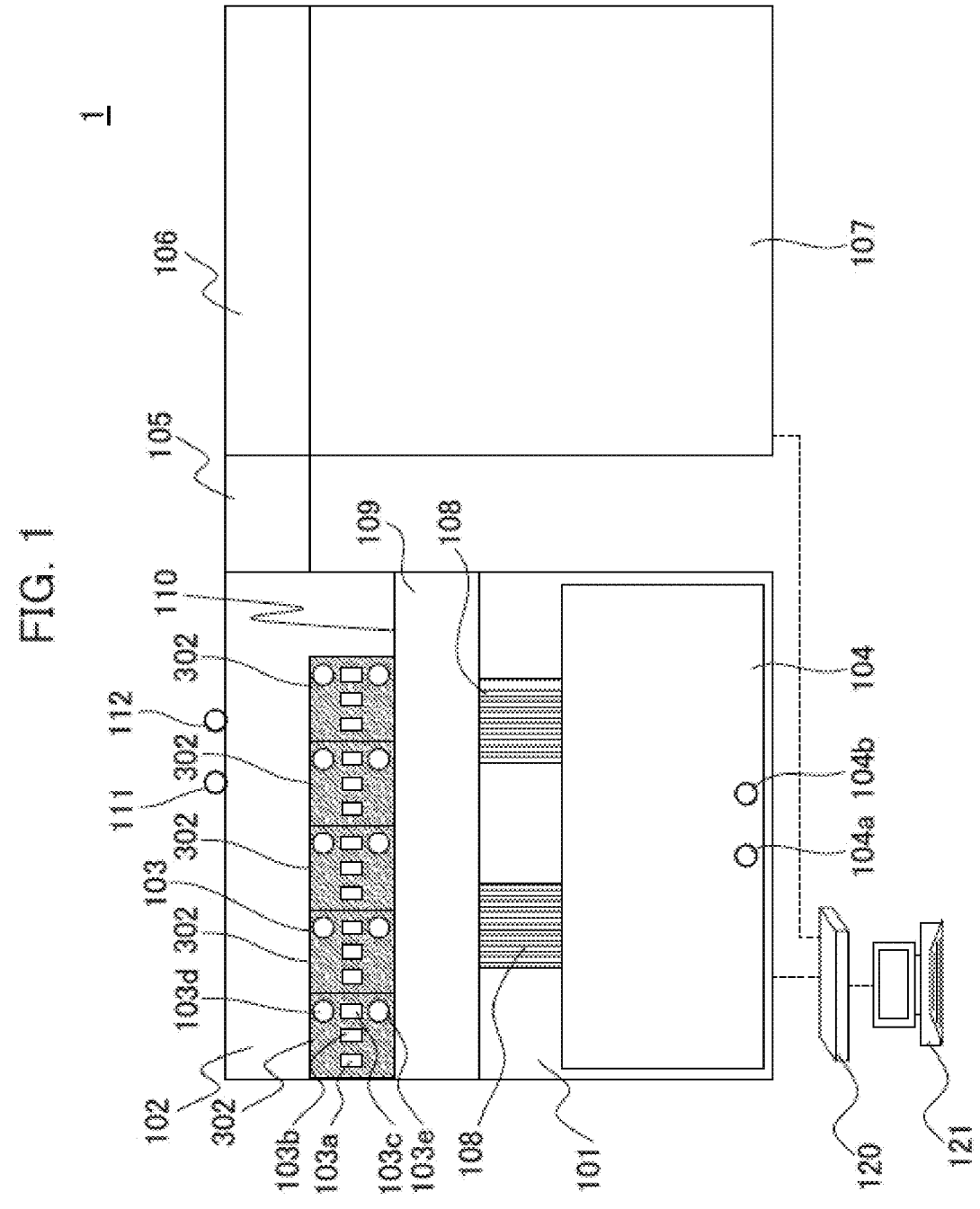
FIG. 1 is a drawing showing a total configuration of an automatic analyzer related to an embodiment of the present invention.

Embodiments of an automatic analyzer and a sample storage device according to the present invention will be described. In the drawings used in the present specification, similar or same reference numerals are given to corresponding and same constituents, and repeated description of such constituents will be omitted.

It is needless to say that constituents (also including element steps) to be described in the following embodiments are not requisites except for, for example, cases in which the constituents are mentioned specifically and cases in which the constituents are apparent in principle.

Figure 2:
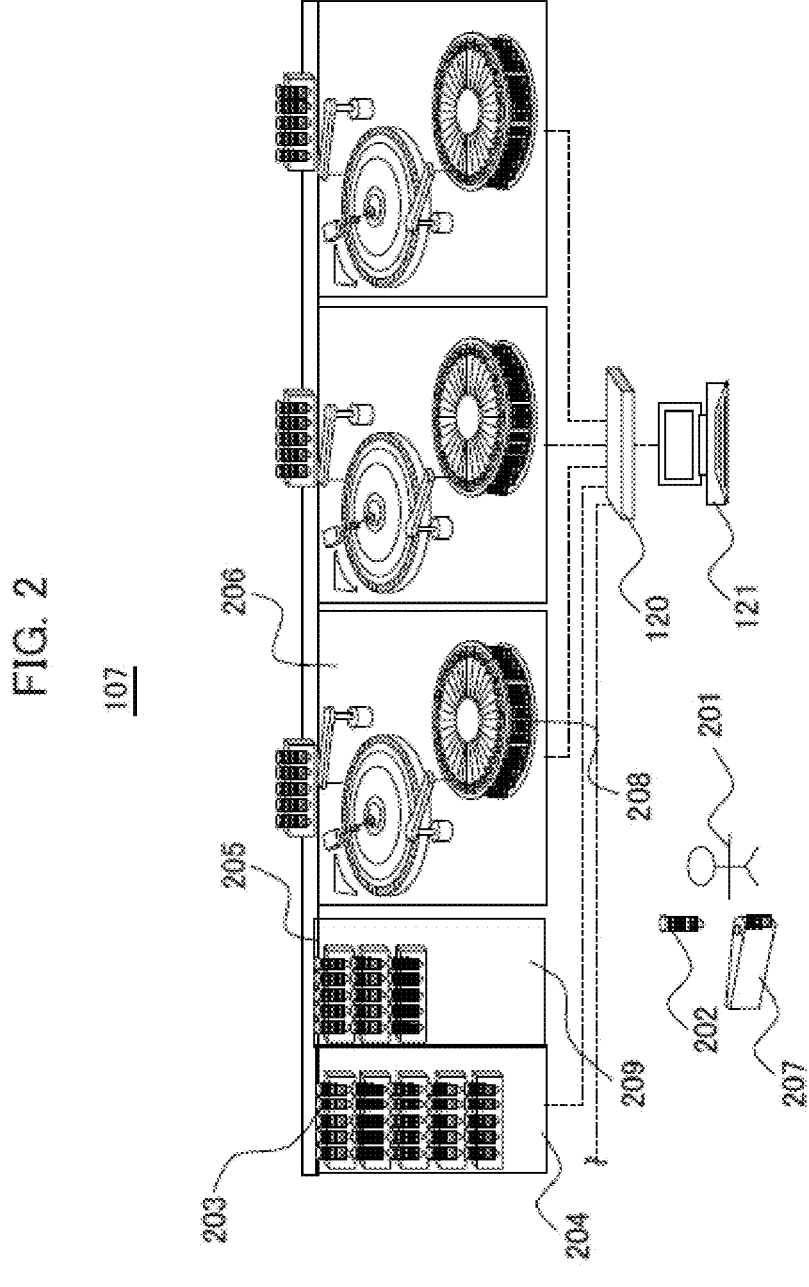
FIG. 2 is a drawing showing a configuration of an analyzation unit of the automatic analyzer related to the embodiment.
Figure 3:
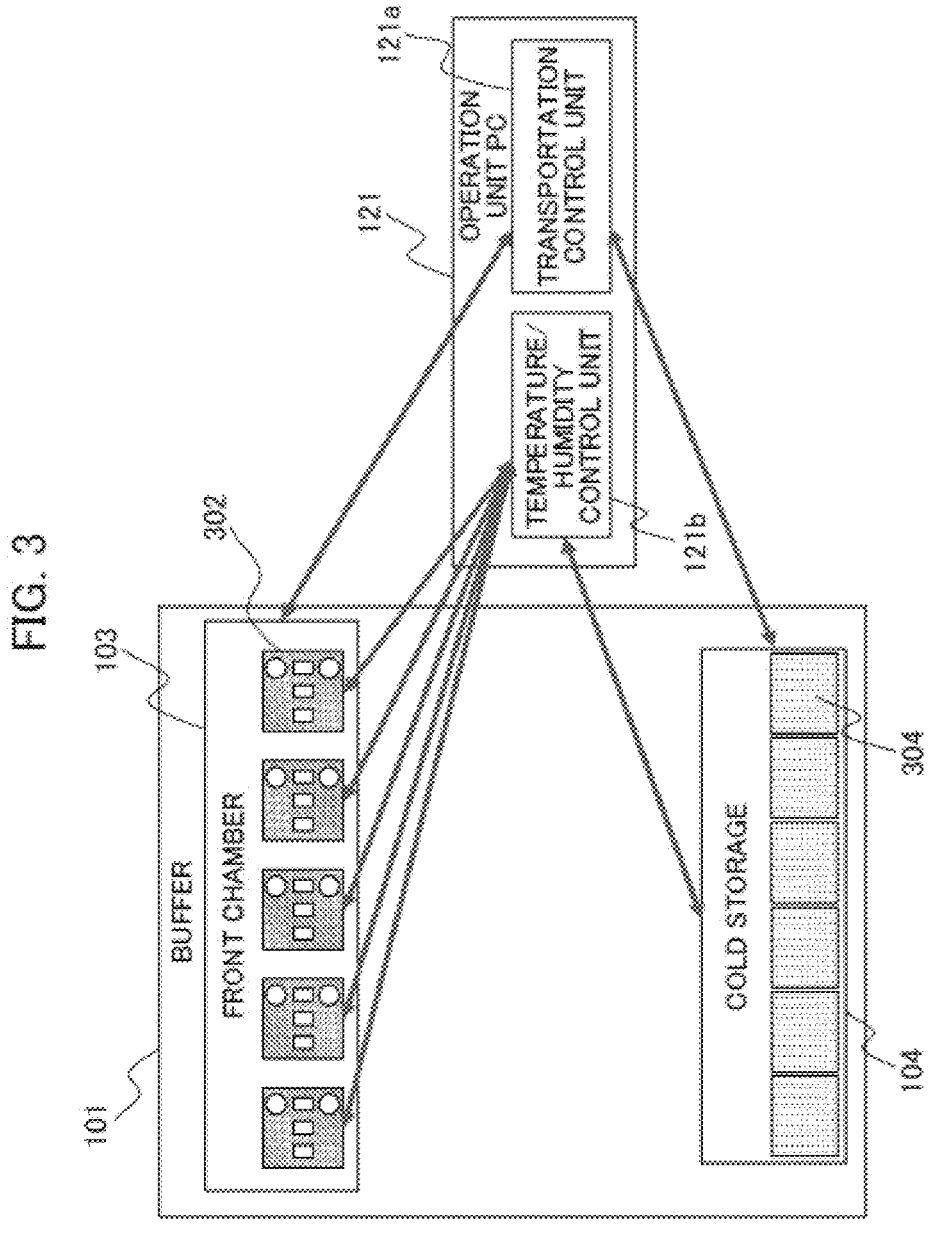
FIG. 3 is a drawing showing a configuration example of software of a portion related to a buffer in the automatic analyzer related to the embodiment.

First, a total configuration of an automatic analyzer and a sample storage device or a configuration of each unit will be described with reference to FIGS. 1 to 3. FIG. 1 is a drawing showing a total configuration of an automatic analyzer related to an embodiment of the present invention. FIG. 2 is a drawing showing a configuration of an analyzation unit. FIG. 3 is a drawing showing a configuration example of software of a portion related to a buffer.

An automatic analyzer (1) illustrated in FIG. 1 includes a transportation line (106), an analyzation unit (107), a buffer (101), and an operation unit PC (121). In the automatic analyzer (1) illustrated in FIG. 1, the buffer (101) and the analyzation unit (107) are connected by a transportation line (105) to carry in and out a sample rack (203) in which one or more sample containers that hold samples are mounted.

FIG. 2 is a drawing showing a configuration of the analyzation unit (107).

In the automatic analyzer (1), the sample (202) which is a target for calibration measurement, accuracy management sample measurement, and patient sample measurement is mounted on the sample rack (203) on which a plurality of containers that store the sample can be mounted by a user (201).

The sample rack (203) on which the sample container is mounted is provided in a sample input unit (204) by the user, and the provided sample rack (203) is carried in the transportation line (205) in sequence and is transported to a single or a plurality of analyzation units (206) analyzing the samples. FIG. 2 shows a case in which three analyzation units (206) are provided, but the number of analyzation units (206) is not particularly limited. One or more analyzation units (206) can be provided.

The analyzation unit (206) is a device that recognizes the sample rack (203) and the sample and executes analyzation necessary for the sample and includes a reagent disk (208) that stores a plurality of reagents (207) used to execute analyzation. A reagent necessary for analyzation is provided in advance in the reagent disk (208) before the user executes the analyzation. The sample rack (203) in which the necessary analyzation has been executed is carried in the buffer (101) or the sample storage unit (209).

The sample input unit (204), the analyzation units (206), and the sample storage unit (209) are connected to the operation unit PC (121) via a hub (120) by each network cable.

Analysis items in the analyzation units (206) are not particularly limited, and a configuration of a known analyzation unit that analyzes biochemical items or immunity items can be adopted. When a plurality of analyzation units are provided, the analyzation units have the same specification or other specifications and the present invention is not particularly limited.

Referring back to FIG. 1, the transportation line (106) is a device that used to transport the sample rack (203) from the sample input unit (204) of the analyzation unit (107) to each analyzation unit (206) and is configured with, for example, a transportation belt, a motor, or the like. However, the configuration is not particularly limited as long as the sample rack (203) can be transported.

The buffer (101) includes a transportation line (102), a front chamber (103), a cold storage (104), an outside buffer temperature meter (111), an outside buffer humidity meter (112), a rack carry-in/out line (108), the transportation line (109), and a partition plate (110).

The sample storage device according to the present invention includes the cold storage (104), the front chamber (103), and a temperature/humidity control unit (121*b*) of the operation unit PC (121) to be described below.

The transportation line (102) is a line for carrying in/out the sample rack (203) in which the sample is provided from the analyzation unit (107) or the buffer (101) and a similar configuration to the transportation line (106). The details of the transportation line (102) will be omitted.

The front chamber (103) is disposed between the cold storage (104) and the transportation line (102), and an inner space is shielded from the outside for the purpose of temperature and humidity control.

The front chamber (103) includes a plurality of front chamber slots (302) each including a heater (103*a*), a cooling fan (103*b*), and a humidity adjustment unit (103*c*). The number of front chamber slots (302) may not be plural and one or more front chamber slots may be provided.

One front chamber slot (302) can wait for the sample rack (203). The sample rack (203) carried out from the cold storage (104) uses the front chamber slot (302) inside the front chamber (103).

In the front chamber slot (302), the cooling fan (103*b*) is a fan configured to blow the cold air for cooling the cold storage (104) to lower temperature of the inside of the front chamber (103). The heater (103*a*) may be a mechanism that heats the air of the inside of the front chamber slot (302) and can be a heating wire or the like although the details of the configuration are not particularly limited. The details of the humidity adjustment unit (103*c*) are not particularly limited either and any of various known configurations such as dehumidification or humidification schemes by hollow fiber membranes can be adopted.

A front chamber temperature meter (103*d*) measures temperature of the inside of the front chamber slot (302) and outputs the measured temperature to the operation unit PC (121), and a front chamber humidity meter (103*e*) measures humidity of the inside of the front chamber slot (302) and outputs the measured humidity to the operation unit PC (121). The front chamber temperature meter (103*d*) and the front chamber humidity meter (103*e*) can have known configurations.

The cold storage (104) is a mechanism that cools the plurality of sample racks (203) in which the samples measured by the analyzation unit (107) are provided and includes a plurality of cold storage slots (304) (see FIG. 3) controlled to have low temperature to prevent evaporation of the samples.

A cold storage temperature meter (104*a*) measures temperature of the inside of the cold storage (104) and outputs the measured temperature to the operation unit PC (121) and a cold storage humidity meter (104*b*) measures humidity of the inside of the cold storage (104) and outputs the measured humidity to the operation unit PC (121). The cold storage temperature meter (104*a*) and the cold storage humidity meter (104*b*) can also have known configurations as in the front chamber temperature meter (103*d*) and the front chamber humidity meter (103*e*).

The transportation line (109) is a line for carrying in/out the sample rack (203) between the cold storage (104) and the front chamber (103) and can have a similar configuration to the transportation line (106).

The rack carry-in/out line (108) is a line that is provided between the front chamber (103) and the cold storage (104) and executes carrying-in/out of the sample rack (203) from/ to the cold storage (104). The rack carry-in/out line (108) can have a similar configuration as the transportation line (106) as in the transportation line (109) or the like.

The rack carry-in/out line (108) has a configuration which is partitioned from the transportation line (102) by a partition plate (110). The partition plate (110) is formed of a deformable material such as rubber or resin and has a form such as a curtain which shields the inside from the outside to control temperature so that the temperature is equal to the temperature of the inside of the cold storage (104).

In the embodiment, the sample rack (203) carried out from the analyzation unit (107) is stored in the cold storage (104) as it is, in sequence of the transportation line (102) and the transportation line (109) and the rack carry-in/out line (108) in the buffer (101) without passing through the front chamber (103). On the other hand, the sample rack (203) carried output from the cold storage (104) waits for a given time in the front chamber (103) via the rack carry-in/out line (108) and the transportation line (109), and then is carried in to the analyzation unit (107) via the transportation line (102).

The outside buffer temperature meter (111) measures temperature of the outside of the buffer (101) and outputs the measured temperature to the operation unit PC (121), and the outside buffer humidity meter (112) measures humidity of the outside of the buffer (101) and outputs the measured humidity to the operation unit PC (121). The outside buffer temperature meter (111) and the outside buffer humidity meter (112) can have known configurations.

The operation unit PC (121) is a unit that is connected to the transportation line (106) or the analyzation unit (107) via the hub (120) and to the buffer (101) by a wired or wireless network line, and thus has a role of controlling an operation by generally controlling information regarding the entire automatic analyzer (1). The operation unit PC (121) includes a screen interface that is ideal from the viewpoint of a system configuration and operability.

The operation unit PC (121) can be implemented using a general-purpose computer or can be implemented as a function of a program executed on a computer. The process can be implemented by storing the process as a program code in a recording unit such as a memory and causing a processor such as a central processing unit (CPU) to execute each program code. The operation unit PC (121) may be configured with hardware such as a dedicated circuit substrate.

In the embodiment, the operation unit PC (121) includes a transportation control unit (121*a*) and the temperature/ humidity control unit (121*b*), as illustrated in FIG. 3, particularly as a unit controlling an operation in the buffer (101).

The transportation control unit (121*a*) is a unit that executes operation control for carrying-in from the transportation line (102) to the cold storage (104) or operation control for carrying-out from the cold storage (104) to the transportation line (102). The transportation control unit (121*a*) executes control for causing the sample rack (203) to wait in the front chamber (103) for a waiting time preset when the sample rack (203) is carried out from the cold storage (104) or control for causing the sample rack (203) not to carry in the sample rack (203) inside the front chamber slot (302) while temperature or humidity is not controlled within a predetermined range in the vacant front chamber slot (302) in which the sample rack (203) does not wait. The details of the transportation control unit will be described with reference to FIG. 4 and the subsequent drawings.

The temperature/humidity control unit (121*b*) controls the temperature of the inside of each front chamber slot (302) of the front chamber (103) between those of the outside of the cold storage (104) and the inside of the cold storage (104), particularly, in a middle of those between the outside of the cold storage (104) and the inside of the cold storage (104). The "middle" in the embodiment may not be an exact middle and can have a likelihood to some extent. For example, a range of an intermediate value±a few ° C. can be treated as the "middle".

The temperature/humidity control unit (121*b*) controls humidity of the inside of each front chamber slot (302) of the front chamber (103). Here, the temperature/humidity control unit (121*b*) controls humidity of the inside of each front chamber slot (302) between those of the outside of the cold storage (104) and the inside of the cold storage (104), particularly, in a middle of those between the outside of the cold storage (104) and the inside of the cold storage (104). The "middle" in the humidity may not be an exact middle and can have a likelihood to some extent. For example, a range of an intermediate value±a few ° C. can be treated as the "middle".

The temperature/humidity control unit (121*b*) periodically controls the temperature or humidity of the front chamber slot (302) in the front chamber (103).

The details of the control will be described with reference to FIG. 4 and the subsequent drawings.

The temperature/humidity control unit (121*b*) controls temperature or humidity of the inside of the cold storage slot (304) of the cold storage (104).

In FIG. 3, the hub (120) is not illustrated for convenience of the illustration.

The total configuration of the automatic analyzer (1) according to the embodiment has been described above.

An analyzation process for a specimen in the automatic analyzer (1) according to the above-described embodiment is generally executed in the following procedure.

In the automatic analyzer (1) according to the embodiment, an analysis request (measurement request) for each sample is made from the operation unit PC (121), a sample to be analyzed is mounted in the sample rack (203) and provided in the sample input unit (204). Information of which analyzation is requested is transmitted to the analyzation unit via a network and a result analyzed by the analyzation unit is transmitted to the operation unit PC (121).

Hereinafter, a configuration and an operation of the buffer (101) which is a feature of the present invention and the details of the operation will be described with reference to FIGS. 4 to 8 will be described.

Figure 4:
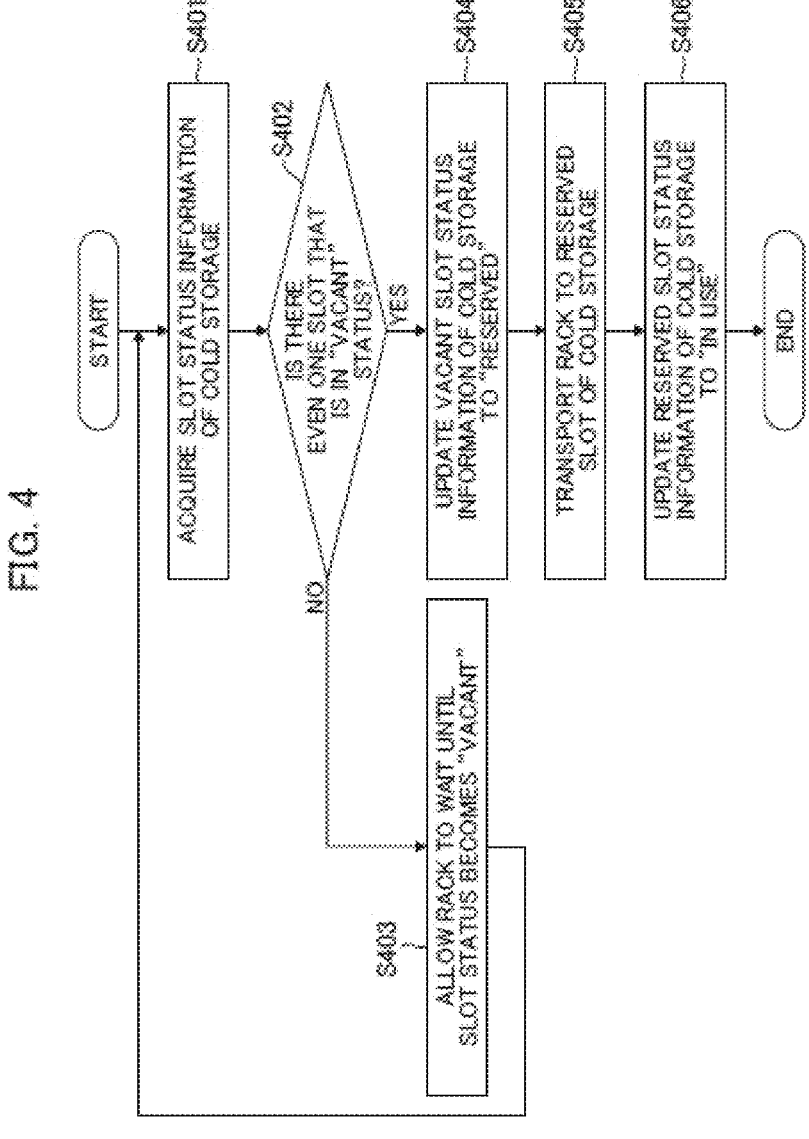
FIG. 4 is a flowchart showing a flow when a rack is carried-in from an analyzation unit and the like to a buffer in the automatic analyzer related to the embodiment.

FIG. 4 is a flowchart showing a flow when a rack is carried-in from the analyzation unit and the like to the buffer.

Figure 5:
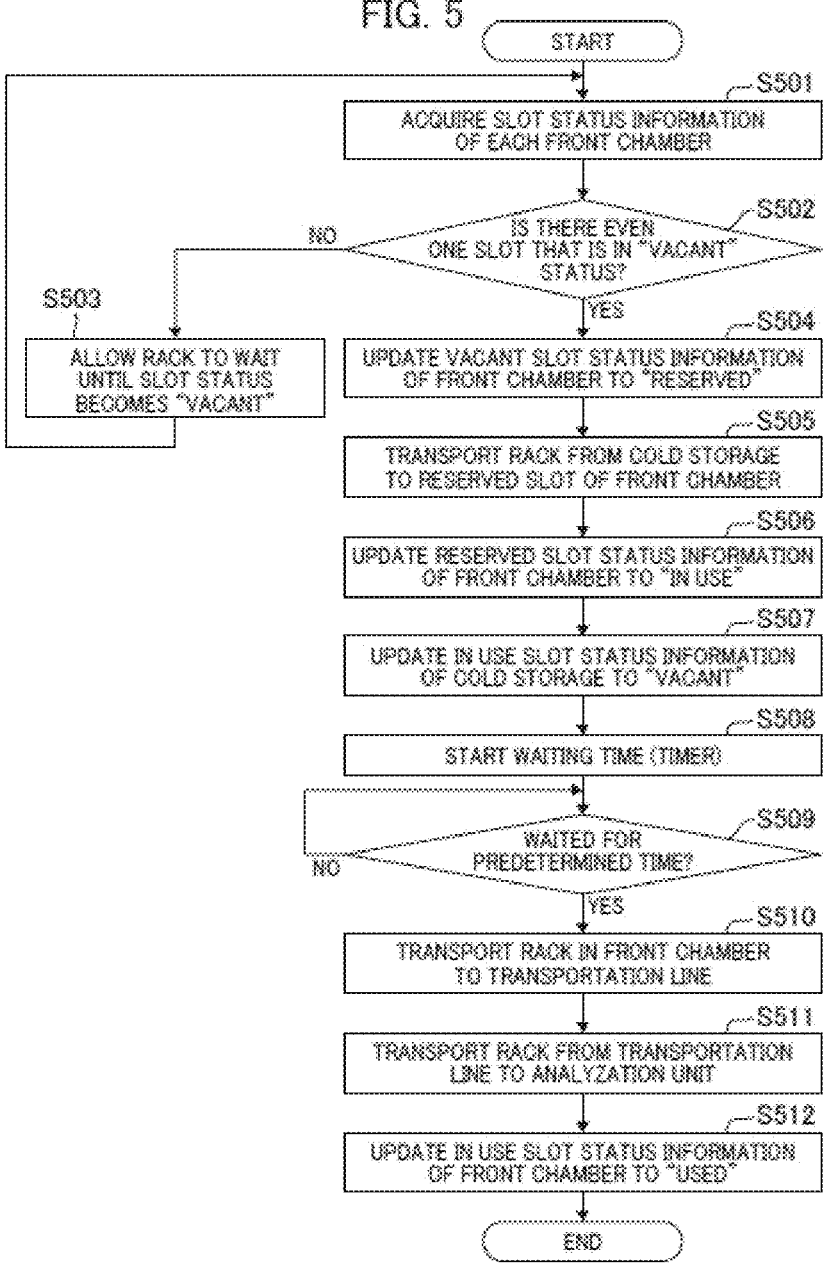
FIG. 5 is a flowchart showing a flow when a rack is carried-out from the buffer to the analyzation unit and the like in the automatic analyzer related to the embodiment.
Figure 6:
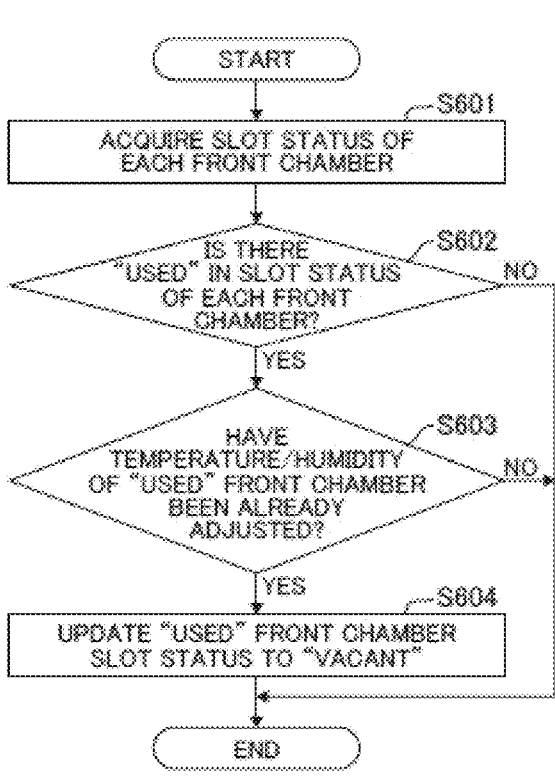
FIG. 6 is a flowchart showing a flow of updating of the front chamber slot status in the automatic analyzer related to the embodiment.
Figure 7:
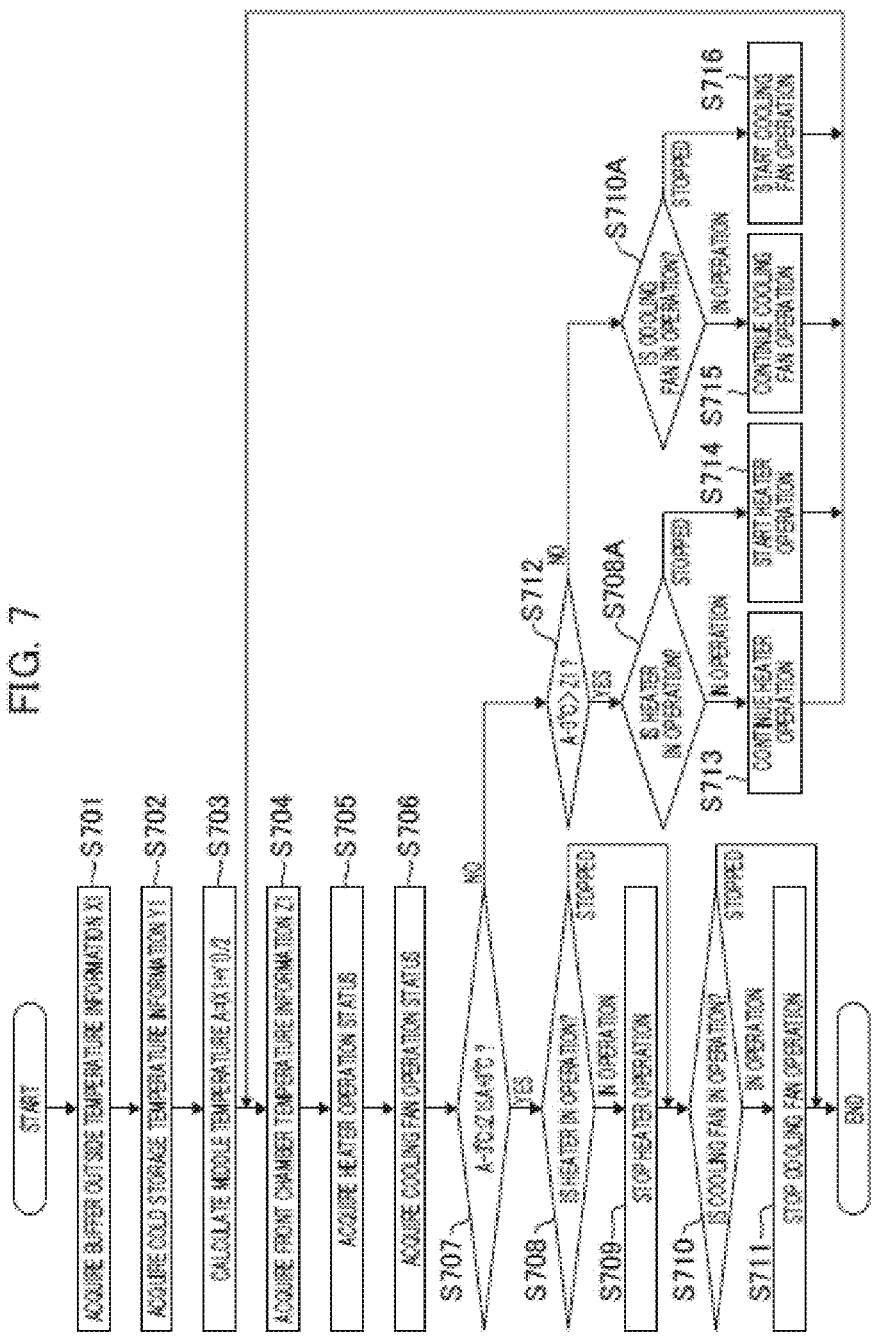
FIG. 7 is a flowchart showing a flow of the temperature management control in the automatic analyzer related to the embodiment.
Figure 8:
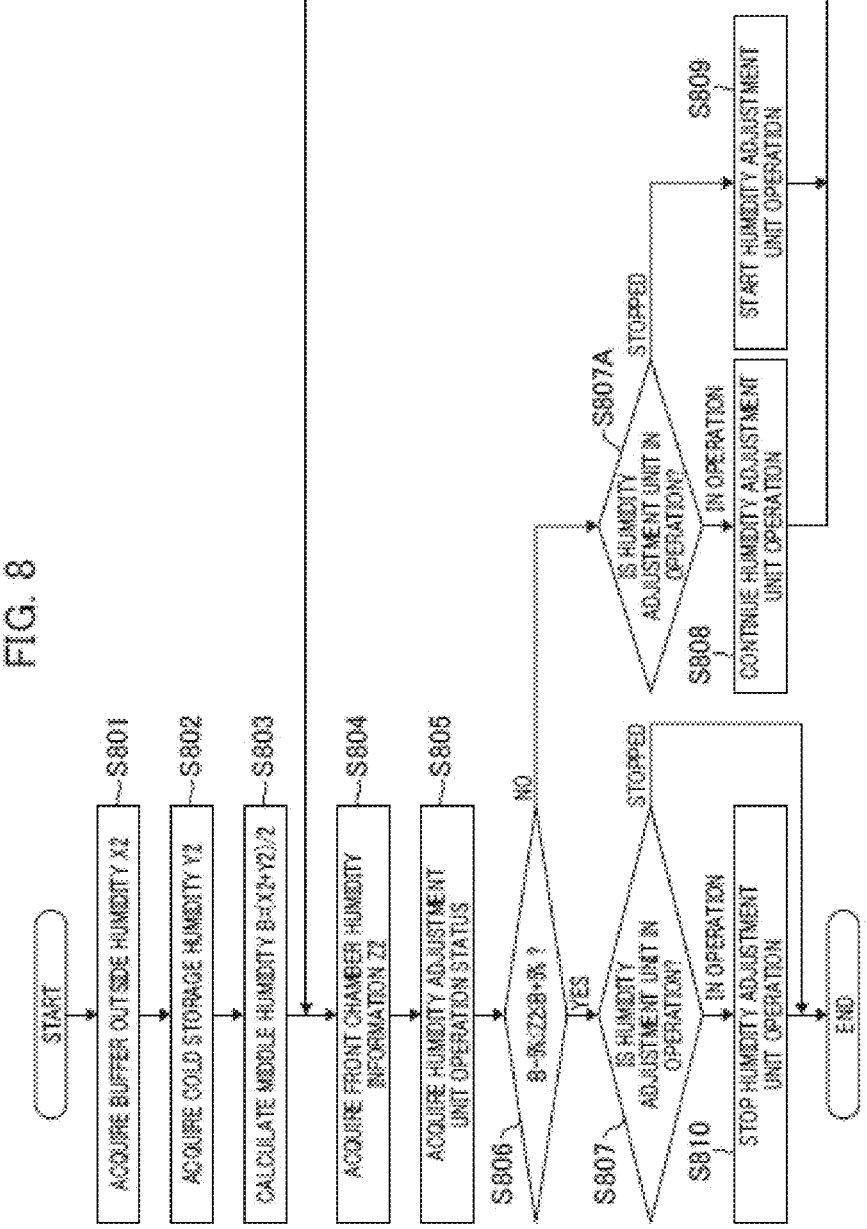
FIG. 8 is a flowchart showing a flow of the humidity management control in the automatic analyzer related to the embodiment.

FIG. 5 is a flowchart showing a flow when a rack is carried-out from the buffer. FIG. 6 is a flowchart showing a flow of updating of the front chamber slot status. FIG. 7 is a flowchart showing a flow of the temperature management control. FIG. 8 is a flowchart showing a flow of the humidity management control.

First, a flow when the sample rack (203) is carried in from the analyzation unit (107) to the buffer (101) will be described with reference to FIG. 4.

As illustrated in FIG. 4, when the sample rack (203) is carried out from the analyzation unit (107) to the transportation line (102), the transportation control unit (121a) acquires slot status information indicating whether there is a vacant cold storage slot (304) in the cold storage (104) (step S401).

Subsequently, the transportation control unit (121a) determines whether there is even one slot that is in a "vacant" status based on the information acquired in step S401 (S402). When it is determined that there is no slot that is in the "vacant" status, the process moves to step S403 and the transportation control unit (121a) executes a waiting process for the sample rack (203) (step S403). In the waiting process, until the slot status of the front chamber (103) becomes "vacant", the sample rack (203) is allowed to wait on a line such as the transportation line (102) or the like or inside the sample storage unit (209) in the analyzation unit (107) or wait inside the front chamber slot (302) of the front chamber (103), and the process (step S401) of acquiring the slot status information of the front chamber (103) and the slot status determination process (step S402) are repeatedly executed.

Conversely, in the slot status determination process of step S402 where there is even one slot that is in the "vacant" status, the transportation control unit (121a) updates the slot status information of the vacant cold storage slot (304) of the input-scheduled cold storage (104) from the "vacant" status to a "reserved status" (step S404). When there are a plurality of vacant cold storage slots (304), one of the vacant cold storage slots is updated to a "reserved status".

Thereafter, the transportation control unit (121a) transports the sample rack (203) to the cold storage slot (304) in the "reserved" status (step S405).

Finally, the transportation control unit (121a) updates the slot status information of the cold storage slot (304) to which the sample rack (203) is input to an "in-use status" (step S406) and completes the flow of the flow when the sample rack (203) of the buffer (101) is carried from the analyzation unit (107).

Next, a flow when the sample rack (203) is carried out from the buffer (101) to the analyzation unit (107) will be described with reference to FIG. 5.

When the sample rack (203) is carried out from the cold storage slot (304), as illustrated in FIG. 5, the transportation control unit (121a) acquires slot status information indicating whether there is a vacant front chamber slot (302) of the front chamber (103) (step S501).

Subsequently, the transportation control unit (121a) determines whether there is even one slot that is in a "vacant" status based on the information acquired in step S501 (step S502). When it is determined that there is no slot that is in the "vacant" status, the process moves to step S503 and the transportation control unit (121a) executes a waiting process for the sample rack (203) (step S503). In the waiting process, until the slot status of the front chamber (103) becomes "vacant", the sample rack (203) is allowed to wait inside the cold storage slot (304), and the process (step S501) of acquiring the slot status information of the front chamber (103) and the slot status determination process (step S502) are repeatedly executed.

Conversely, in the slot status determination process of step S502 where there is even one slot that is in the "vacant" status, the transportation control unit (121a) executes a slot status information updating process (step S504) of updating the status information of the input-scheduled front chamber slot (302) from a "vacant status" to a "reserved status" and subsequently executes carrying-in of the sample rack (203) from the cold storage (104) to the "reserved" front chamber slot (302) (step S505). When there are a plurality of vacant front chamber slots (302), one of the vacant front chamber slots is updated to a "reserved status".

After the sample rack (203) is carried in, the transportation control unit (121a) updates the slot status information of the front chamber slot (302) to an "in-use" status (step S506) and updates the slot status information of the carried-out cold storage slot (304) to a "vacant" status (step S507).

Thereafter, the transportation control unit (121a) starts counting a waiting time (timer) of the sample rack (203) for the front chamber slot (302) carrying the sample rack (203) (step S508).

Here, when the sample rack (203) is carried in from the cold storage slot (304) to the analyzation unit (107), in other words, when the sample rack (203) is transported from the cold storage (104) in a low temperature to a region of an ambient temperature, a sample and a sample container that stores the sample become cold through cooling. When the sample and the sample container are carried in the region in the ambient temperature directly, condensation occurs in the container that stores the sample due to a difference in temperature, and thus the container is allowed to wait in the front chamber slot (302) for about 1 minute.

To determine whether the sample rack (203) has waited for a predetermined time, the transportation control unit (121a) determines whether the waiting time has passed (step S509). When it is determined in step S509 that the sample rack has not waited for the predetermined time, the process of step S509 is repeated until the predetermined time has passed.

Conversely, when it is determined in step S509 that the sample rack has waited for the predetermined time, the transportation control unit (121a) transports the sample rack (203) from the front chamber slot (302) to the transportation line (102) (step S510) and transports the sample rack (203) from the transportation line (102) to the transportation line (105) connecting the buffer (101) to the analyzation unit (107) directly (step S511).

Thereafter, the transportation control unit (121a) updates the slot status of the carried-out front chamber slot (302) from the "in-use" status to a "used" status (step S512) and moves to a process after FIG. 6.

Next, a flow of updating of the slot status information of the front chamber (103) executed appropriately after step S512 illustrated in FIG. 5 will be described with reference to FIG. 6.

First, the transportation control unit (121a) acquires the slot status information of each front chamber slot (302) of the front chamber (103) (step S601) and determines whether there is the "used" status in the slot status information of each front chamber slot (302) based on the acquired information (step S602). When it is determined in step S602 that there is the "used" status, the process moves to step S803. When it is determined that there is no "used" status, the process ends.

Subsequently, the transportation control unit (121a) determines whether temperature/humidity of the "used" front chamber slot (302) has already been adjusted (step S603). Step S603 is determined, for example, by determining whether temperature information in the slot status information "has been adjusted" by completing the process of FIG. 7 to be described below and whether humidity information in the slot status information "has been adjusted" by completing the process of FIG. 8.

When it is determined in step S603 that the temperature/humidity has been adjusted, the transportation control unit (121a) updates the slot status information of the corresponding front chamber slot (302) from the "used" status to the "vacant status" (step S604) and completes the process.

When the sample rack (203) is carried out from the buffer (101) to the analyzation unit (107) in FIG. 5, the slot status information of the used front chamber (103) is in the "used" status. When the sample rack (203) is carried in and out continuously in the same front chamber (103), there is concern of the temperature/humidity in the front chamber (103) being gradually close to the ambient temperature. Therefore, the temperature/humidity in the front chamber (103) is controlled in the middle between that of the outside and that of the cold storage (104) such that the front chamber (103) cannot be continuously used as described in step S512 or S601 to step S604. When the sample rack (203) can wait in the front chamber (103), the slot status information is preferably updated to the "vacant" status.

Next, a flow of temperature management control inside the front chamber slot (302) of the front chamber (103) will be described with reference to FIG. 7.

It is assumed that the control illustrated in FIG. 7, the control illustrated in FIG. 6 described above, and the control illustrated in FIG. 8 to be described below are executed periodically while the automatic analyzer (1) is operating. On the other hand, the control illustrated in FIG. 4 or 5 is executed when an instruction to transport the sample rack (203) is given.

First, the temperature/humidity control unit (121b) acquires temperature information X1 outside of the buffer (101) (=outside air) from the outside buffer temperature meter (111) (step S701) and acquires temperature information Y1 of the cold storage (104a) (step S702). An order of steps S701 and S702 is random.

Subsequently, the temperature/humidity control unit (121b) calculates middle temperature A=(X1+Y1)/2 which is setting information of the front chamber slot (302) from the temperature information acquired in steps S701 and S702 (step S703).

Subsequently, the temperature/humidity control unit (121b) acquires temperature information Z1 of the front chamber (103) from the front chamber temperature meter (103d) (step S704). The temperature/humidity control unit (121b) acquires operation status information (stop/operating) of the heater (103a) (step S705) and acquires operation status information (stop/operating) of the cooling fan (103b) (step S706). An order of steps S704 to S706 is random. Any step may be executed earlier or the steps may be executed simultaneously.

Subsequently, the temperature/humidity control unit (121b) determines whether temperature Z1 of the inside of the front chamber slot (302) is within a range of value of ±3° C. (a value that is nearly the middle temperature) which is nearly the middle temperature A calculated in step S703 (whether a condition of A−3° C.≤Z1≤A+3° C. is satisfied) (step S707).

When it is determined in step S707 that the condition of A−3° C.≤Z1≤A+3° C. is satisfied, the process moves to step S708 and the temperature/humidity control unit (121b) executes an operation of confirming the heater (103a) acquired in step S705 (step S708). When it is determined that the heater (103a) is "in operation", the operation of the heater (103a) is stopped (step S709) and then the process moves to step S710. When it is determined that the heater (103a) is "stopped", step S709 is omitted and the process moves to step S710.

Subsequently, the temperature/humidity control unit (121b) executes an operation of confirming the cooling fan (103b) acquired in step S706 (step S710). When it is determined that the cooling fan (103b) is "in operation", the operation of the cooling fan (103b) is stopped (step S711) and the process ends. Conversely, when it is determined that the cooling fan (103b) is "stopped", the process ends as it is.

Conversely, when it is determined in step S707 that the condition of A−3° C.≤Z1≤A+3° C. is not satisfied, the process moves to step S712 and the temperature/humidity control unit (121b) determines whether the temperature Z1 of the inside of the front chamber slot (302) is lower than A−3° C. as a subsequent determination process (step S712).

When it is determined in step S712 that Z1 is lower than A−3° C., the temperature/humidity control unit (121b) moves the process to step S708A and executes an operation of confirming the heater (103a) acquired in step S705 (step S708A). When it is determined that the heater (103a) is "in operation", the temperature/humidity control unit (121b) continues the operation of the heater (103a) (step S713) and returns the process to step S704. Conversely, when it is determined that the heater (103a) is "stopped", the operation of the heater (103a) is started (step S714) and the process returns to step S704.

When it is determined in step S712 that Z1 is not lower than A−3° C., that is, it is determined that Z1 is higher than A+3° C., the temperature/humidity control unit (121b) moves the process to step S710A and executes the operation of confirming the cooling fan (103b) acquired in step S706 (step S710A). When it is determined that the cooling fan (103b) is "in operation", the temperature/humidity control unit (121b) continues the operation of the cooling fan (103b) (step S715) and returns the process to step S704. Conversely, when it is determined that the cooling fan (103b) is "stopped", the operation of the cooling fan (103b) is started (step S716) and the process returns to step S704.

Next, a flow of the humidity management control inside the slot (302) of the front chamber (103) will be described with reference to FIG. 8.

First, the temperature/humidity control unit (121b) acquires humidity information X2 of the outside (outside air) of the buffer (101) from the outside buffer humidity meter (112) (step S801) and acquires humidity information Y2 of the cold storage (104) from the cold storage humidity meter (104b) (step S802). An order of steps S801 and S802 is random.

Subsequently, the temperature/humidity control unit (121b) calculates middle humidity B=(X2+Y2)/2 which is setting humidity of the front chamber slot (302) acquired in steps S801 and S802 (step S803).

Subsequently, the temperature/humidity control unit (121b) acquires humidity information Z2 of the front chamber (103) from the front chamber humidity meter (103e) (step S804). The temperature/humidity control unit (121b) acquires operation status information (stop/operating) of the humidity adjustment unit (103c) (step S805). An order of steps S804 and S805 is random.

Subsequently, the temperature/humidity control unit (121$b$) determines whether humidity Z2 of the inside of the front chamber slot (302) is within a range of value of ±596 (a value that is nearly the middle temperature) which is nearly the middle humidity B calculated in step S803 (whether a condition of B−5%≤Z2≤B+5% is satisfied) (step S806).

When it is determined in step S806 that the condition of B−5%≤Z2≤B+5% is satisfied, the process moves to step S807 and the temperature/humidity control unit (121$b$) executes an operation of confirming the humidity adjustment unit (103$c$) acquired in step S805 (step S807). When it is determined that the humidity adjustment unit (103$c$) is "in operation", the operation of the humidity adjustment unit (103$c$) is stopped (step S810) and the process ends. Conversely, when it is determined that the humidity adjustment unit (103$c$) is "stopped", the process ends as it is.

When it is determined in step S806 that the condition of B−5%≤Z2≤B+5% is not satisfied, the process moves to step S807A and the temperature/humidity control unit (121$b$) executes an operation of confirming the humidity adjustment unit (103$c$) acquired in step S805 as a subsequent determination process (step S807A). When it is determined that the humidity adjustment unit (103$c$) is "in operation", the temperature/humidity control unit (121$b$) continues the operation of the humidity adjustment unit (103$c$) (step S808) and returns the process to step S804. Conversely, when it is determined that the operation of the humidity adjustment unit (103$c$) is "stopped", the operation of the humidity adjustment unit (103$c$) is started (step S809) and the process returns to step S804.

Next, advantageous effects of the embodiment will be described.

According to the above-described embodiment, the automatic analyzer (1) includes: the analyzation unit (107), the transportation line (102) that executes carrying-in/out of the sample rack (203) in which a sample is mounted from/to the analyzation unit (107), the cold storage (104) that cools a plurality of the sample racks (203) in which the sample having been measured in the analyzation unit (107) is mounted, the transportation control unit (121$a$) that executes operation control for carrying-in of the sample rack from the transportation line (102) to the cold storage (104) and operation control for carrying-out of the sample rack from the cold storage (104) to the transportation line (102); the front chamber (103) that is disposed between the cold storage (104) and the transportation line (102), an inner space of the front chamber (103) being shielded from the outside; and the temperature/humidity control unit (121$b$) that controls a temperature of the inside of the front chamber (103) to a temperature between that of the outside of the cold storage (104) and that of the inside of the cold storage (104).

In the present configuration, it is possible to alleviate a difference in temperature if temperature moves from a low temperature to the outside temperature, and thus it is possible to inhibit occurrence of condensation inside the sample container compared to a configuration of a device of the related art. Accordingly, it is possible to reduce dilution of a sample caused due to condensation and reduce a situation in which a sample is lost and blood of a patient is collected again. Thus, it is possible to reduce a burden on a patient and an operator.

The temperature/humidity control unit (121$b$) controls temperature inside the front chamber (103) to a temperature middle of those of the outside and the inside of the cold storage (104). Therefore, it is possible to cause a change in temperature during carrying-in from the cold storage (104) to the front chamber (103) to be substantially equal to a difference in temperature during carrying-out from the front chamber (103), prevent a difference in temperature during one of carrying-in to the front chamber (103) and carrying-out from the front chamber (103) from being greater than a difference in temperature during the other, and inhibit occurrence of condensation in the sample container more reliably.

The temperature/humidity control unit (121$b$) configured to control the humidity of the inside of the front chamber (103) is further included. Thus, it is possible to inhibit occurrence of condensation in the sample container at a higher probability.

The temperature/humidity control unit (121$b$) controls the temperature or humidity inside the front chamber (103) periodically. Thus, it is possible to increase a timing at which the sample rack (203) is carried in the front chamber (103), and thus avoid a decrease in an analyzation throughput by waiting in the front chamber (103).

The front chamber (103) includes the heater (103$a$). Thus, temperature adjustment in the front chamber slot (302) of the front chamber (103) can be efficiently executed with a simple configuration.

The front chamber (103) includes the cooling fan (103$b$) that blows the air for cooling the cold storage (104). Thus, it is necessary to provide a cooling mechanism separately, and it is possible to implement the temperature adjustment of the front chamber (103) while simplifying the configuration of the device.

The transportation control unit (121$a$) allows the rack to wait within the front chamber (103) for a waiting time set beforehand in carrying-out the sample rack (203) from the cold storage (104). Thus, it is possible to adjust the temperature of a sample, a sample container, or the air inside the container more reliably, and it is possible to inhibit occurrence of condensation.

The transportation control unit (121$a$) does not allow the sample rack (203) to be carried-in to the front chamber (103) while the temperature is not controlled to a predetermined range, the front chamber (103) being vacant where the sample rack (203) is not waiting. Thus, it is possible to maximize efficiency of the temperature control and inhibit occurrence of condensation more reliably.

The front chamber (103) is connected to the transportation line (102). Thus, it is possible to minimize the size of the device.

A space between the front chamber (103) and the cold storage (104) is shielded from the outside, and temperature of the space is controlled. It is possible to inhibit occurrence of condensation due to a change in temperature before the carrying-in to the front chamber (103) and further reduce dander of the occurrence of the condensation.

REFERENCE SIGNS LIST

1: automatic analyzer
101: buffer
102: transportation line
103: front chamber
103$a$: heater
13$b$: cooling fan
103$c$: humidity adjustment unit
103$d$: front chamber temperature meter
103$e$: front chamber humidity meter
104: cold storage
104$a$: cold storage temperature meter
104$b$: cold storage humidity meter
105: transportation line

13

106: transportation line
107: analyzation unit
108: rack carry-in/out line
109: transportation line
110: partition plate
111: outside buffer temperature meter
112: outside buffer humidity meter
120: hub
121: operation unit PC
121a: transportation control unit (control unit)
121b: temperature/humidity control unit (temperature control unit, humidity control unit)
201: user
202: sample
203: sample rack
204: sample input unit
205: transportation line
206: analysis unit
207: reagent
208: reagent disk
209: sample storage unit
302: front chamber slot
304: cold storage slot
The invention claimed is:

1. An automatic analyzer comprising:
an analyzation unit;
a transportation line, including a belt and a motor driving the belt, that executes carrying-in/out of a rack, among a plurality of racks, in which a sample is mounted from/to the analyzation unit;
a cold storage that cools the plurality of the racks in which the sample having been measured in the analyzation unit is mounted;
a control unit configured to execute operation control for carrying-in of the rack from the transportation line to the cold storage and operation control for carrying-out of the rack from the cold storage to the transportation line;
a front chamber that is disposed between the cold storage and the transportation line, an inner space of the front chamber being shielded from the outside, and the front chamber having a first entry/exit and a second entry/exit; and
a temperature control unit that controls a temperature of the inside of the front chamber to a temperature between that of the outside of the cold storage and that of the inside of the cold storage,
wherein the transportation line is adjacent to only one of the first entry/exit and the second entry/exit of the front chamber, and
wherein the automatic analyzer further comprises:
a partition plate formed a deformable material disposed between the front chamber and the cold storage which shields an inside space between the front chamber and the cold storage from outside of the inside space to keep the inside space a same temperature as the cold storage.

2. The automatic analyzer according to claim 1, wherein the temperature control unit is configured to control a temperature inside the front chamber to a temperature middle of those of the outside and the inside of the cold storage.

3. The automatic analyzer according to claim 1, further comprising:
a humidity control unit configured to control humidity of the inside of the front chamber.

4. The automatic analyzer according to claim 1, wherein the temperature control unit is configured to control a temperature inside the front chamber periodically.

5. The automatic analyzer according to claim 3, wherein the humidity control unit is configured to control the humidity inside the front chamber periodically.

6. The automatic analyzer according to claim 1, wherein the front chamber comprises a heater.

7. The automatic analyzer according to claim 1, wherein the front chamber comprises a cooling fan that blows the air for cooling the cold storage.

8. The automatic analyzer according to claim 1, wherein the control unit is configured to allow the rack to wait within the front chamber for a waiting time set beforehand in carrying-out the rack from the cold storage.

9. The automatic analyzer according to claim 8, wherein the control unit is configured to not allow the rack to be carried-in to the front chamber while the temperature is not controlled to a predetermined range, the front chamber being devoid of any rack.

10. The automatic analyzer according to claim 1, wherein the front chamber is connected to the transportation line.

11. The automatic analyzer according to claim 1, wherein the front chamber includes a plurality of front chamber slots, and the temperature control unit controls the plurality of front chamber slots independently.

12. The automatic analyzer according to claim 1, wherein the temperature control unit is configured to control a temperature of the inside of the front chamber between that of the outside of the cold storage and that of the inside of the cold storage when the sample is carried in to the cold storage.

13. The automatic analyzer according to claim 1, further comprising:
a buffer that includes the front chamber and the cold storage.

* * * * *